Nov. 14, 1967  G. E. MAFFEY, JR  3,352,368
PIVOTED TRIGGER MEANS FOR POWER-OPERATED REVERSIBLE TOOL
Filed Aug. 30, 1965
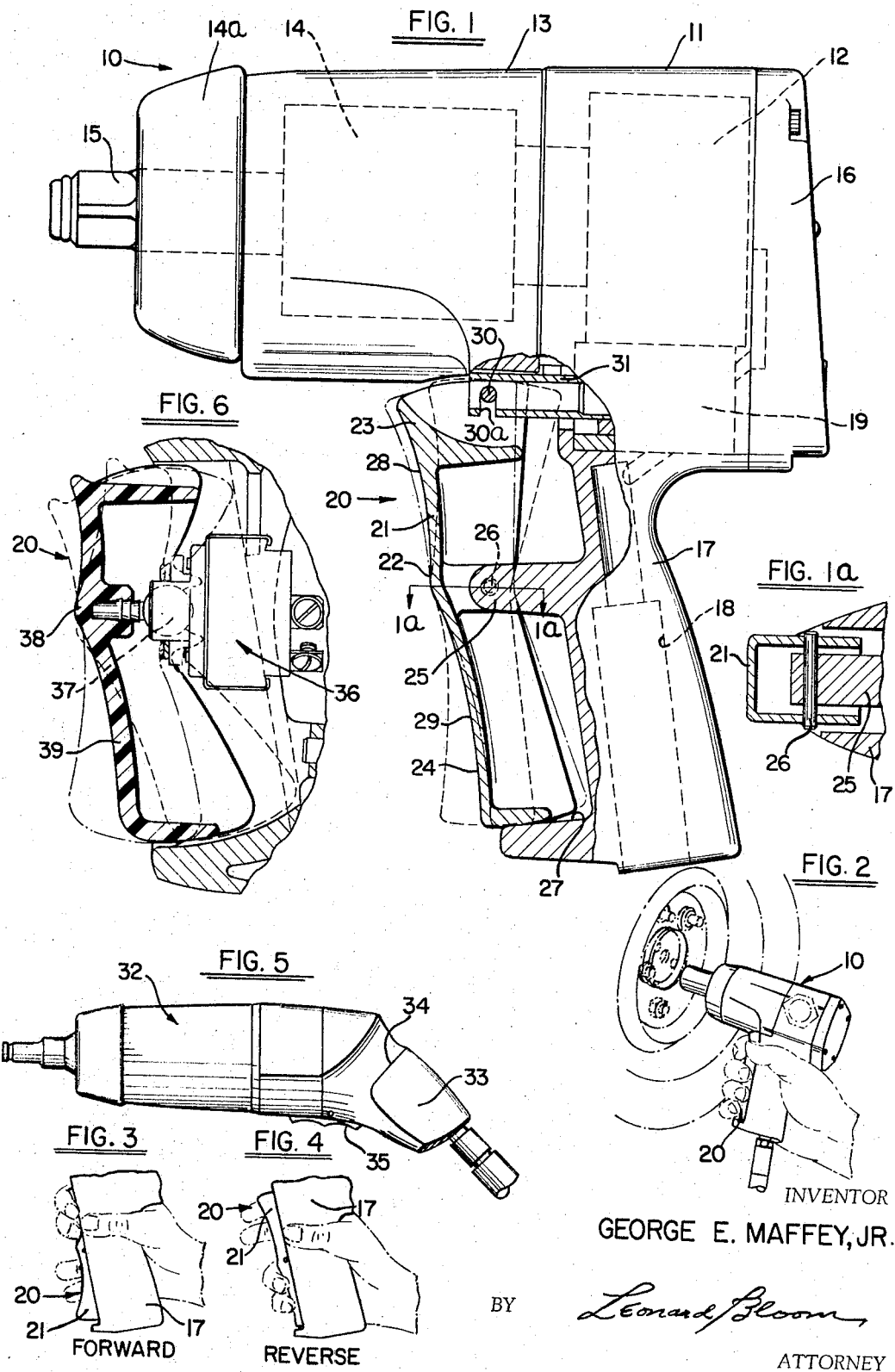
INVENTOR
GEORGE E. MAFFEY, JR.
BY Leonard Bloom
ATTORNEY United States Patent Office 3,352,368
Patented Nov. 14, 1967

3,352,368
PIVOTED TRIGGER MEANS FOR POWER-OPERATED REVERSIBLE TOOL
George E. Maffey, Jr., Timonium, Md., assignor to The Black and Decker Manufacturing Company, Towson, Md.
Filed Aug. 30, 1965, Ser. No. 483,650
8 Claims. (Cl. 173—169)

ABSTRACT OF THE DISCLOSURE

The device herein disclosed relates to a power-operated, portable, reversible tool and includes a housing having a pendant pistol-grip handle; a reversible motor is disposed within the handle and, when energized, rotates an output spindle; a trigger is pivoted on the handle for ready and secure grasping by the operator and is adapted, when pivoted in one direction, to cause spindle rotation in a forward direction, and when pivoted in the opposite direction, to cause spindle rotation in the reverse direction. As a result, the operator does not have to alter his normal gripping position when shifting from forward to reverse spindle rotation, and vice versa.

The present invention relates to a pivoted trigger means for a portable power-operated reversible tool, and more particularly, to a trigger means which facilitates a convenient "one-hand" operation of a portable reversible tool.

In the prior art, especially the practice heretofore resorted to in commerce portable power-operated reversible tools have been manufactured and sold in which the power is supplied either electrically or pneumatically. In the electrical embodiment, the traditional practice of the prior art has been to reverse the direction of rotation of the tool by one of two means: one, a rotatable brush cap mounted rearwardly of the motor housing; and two, an electrical reversing switch mounted on the handle separate and apart from the main control or "on/off" switch. In the pneumatic embodiment, the traditional practice has been to reverse the direction of rotation by means of a reversing valve provided in the tool housing separately of the main control or "throttle" valve, the latter being operated through a suitable trigger or lever. The reversing valve may comprise, for example, a valve spool or other member journaled transversely within an end cap which is secured rearwardly of the motor housing. Other reversing means for pneumatic tools may involve a rotating knob positioned at the rear of the tool housing, or else a lever mounted above the trigger for the tool. In each case, however, whether the reversible tool is electrically or pneumatically operated, it is necessary for the operator to, first, grasp the tool handle with one hand to support the tool and to operate the trigger or its equivalent, and secondly, to use his other hand for manipulating the reversing element of the tool. This usually requires the operator to use both of his hands, one to control the energy being supplied to the tool, and the other to control its direction of rotation; and hence the operation of the tool becomes unwieldly, inconvenient, and somewhat time-consuming.

Accordingly, it is an object of the present invention to eliminate this prior art deficiency, and specifically, to provide a novel trigger means which facilitates a true "one-hand" operation of a portable power-operated reversible tool.

It is another object of the present invention to eliminate the prior art necessity for separately-manipulatable reversing members, and in lieu thereof, to provide a single trigger member which energizes the tool and simultaneously determines its direction of rotation.

It is yet another object to provide a pivoted trigger means which directly facilitates both "forward" and "reverse" operation of the tool, yet in a convenient, facile manner, such that the operator may quickly shift the gripping emphasis of his hand along the tool handle so as to change from one mode of operation to another.

It is a further object to provide a pivoted trigger means which extends almost the entire length of the pistol-grip pendant handle for a portable power-operated reversible tool, so that the portion of the tool handle which is grasped by the operator determines whether the tool will be operated in its "forward" or in its "reverse" direction.

It is a still further object to provide a true "one-hand" control in a portable impact wrench, such that the direction of rotation of the tool may be quickly changed, and such that a "rocking" action is provided to assist in removing "frozen" bolts or lugs from tire rims or other applications.

It is again another object to facilitate a "feathering" action of the tool (in either its forward or reverse drive positions) by selective application of the degree of finger pressure exerted on the elongated trigger member.

In accordance with the broad teachings of the present invention, there is herein illustrated and described for use in conjunction with a portable power-operated reversible tool, the combination of a housing including a portion thereof providing a handle means for the tool, a trigger having an intermediate portion pivotably mounted on the handle means, respective leg portions formed on the trigger on opposite sides of its pivotally-mounted intermediate portion, reversible control means within the housing for energizing the tool for "forward" or "reverse" operation, respectively, and means including a single movable operating member connecting the control means with the trigger, whereby the operator may alternately and selectively engage the respective leg portions of the trigger to move the single operating member in one direction or another for energizing the tool and simultaneously establishing forward or reverse operation, respectively, thereby providing for a substantially "one-hand" operation of the tool.

In accordance with one embodiment of the present invention, the tool is pneumatically operated, the reversible control means includes a reversible valvular means, and the operating member comprises a valve stem which is connected between the valvular means and one of the respective leg portions of the trigger.

In accordance with another embodiment of the present invention, the tool is electrically-operated, the reversible control means comprises a reversible electric switch, and the operating member comprises a pivoted toggle connected between the reversible switch and a pivotally-mounted intermediate portion of the trigger.

In accordance with a further aspect of the present invention, the front face of the handle is recessed along substantially the full length of the handle, and a protruding boss is formed on the handle intermediately of the recessed front face. The trigger comprises an elongated member, preferably die-cast aluminum, and having a generally U-shaped cross-section. The intermediate portion of the trigger member straddles the boss formed on the handle, and a pin passes through the trigger member and the boss on the handle to pivot the trigger member about a transverse axis. The respective leg portions of the trigger member extend from the pivot, along the recessed front face of the handle, and terminate adjacent to the respective ends of the handle. Each of the leg portions of the trigger member has a concave front surface formed for engagement by the operator's fingers. One of the leg portions of the trigger member is depressed to energize the tool in its "forward" direction of rotation, while the other leg portion is depressed to energize the tool in the "reverse" position. Means are provided to bias the trigger, and hence the control means, to a "neutral" or "off" position intermediate its forward and reverse positions. With this arrangement, the operator may quickly engage the desired leg portion of the trigger member for energizing the tool and simultaneously establishing either forward or reverse operation, respectively. The position of the operator's hand with respect to the handle, as well as the emphasis exerted by the operator's fingers, determines whether the tool is operated in its forward or reverse position; and the shifting between the two positions is quick, convenient, and facilitates a truly "one-hand" operation and control of the tool.

The present invention facilitates the design and manufacture of a portable power-operated reversible impact wrench, one which conveniently requires only one hand in usage, and one which comprises, in combination, a motor housing having a a reversible motor therein, an impact clutch housing secured forwardly of the motor housing, an impact clutch mechanism in the impact clutch housing, the motor housing having an integrally-formed pendant portion forming a handle for the wrench, the handle having arecessed front face, a manually-manipulatable trigger mounted in the recessed front face of the handle, the trigger having respective integrally-formed portions selectively engageable by the operator for energizing the motor and simultaneously establishing "forward" or "reverse" operation of the wrench, respectively, and reversible control means for the motor, the reversible control means being mounted in the motor housing and being responsive to the manual actuation of the trigger.

The present invention further facilitates the design and manufacture of a portable power-operated reversible tool, one which is lightweight and compact, and one which comprises, in combination, a housing including a reversible motor, a handle secured rearwardly of the housing and forming an obtuse angle therewith, a reversible control means in the tool for energizing the motor and simultaneously establishing "forward" or "reverse" operation of the tool, a trigger mounted on the underside of the handle, the trigger being operatively connected with the reversible control means and having respective portions alternately engageable by the operator's fingers for energizing the tool in its forward or reverse direction, respectively, and the handle having a concave recess running substantially around the handle for receiving the web portion of the operator's hand, between the thumb and forefinger, in his normal grasp of the handle.

These and other objects of the present invention will become apparent from a reading of the following specification, taken in conjunction with the enclosed drawings, in which:

FIGURE 1 is a side elevation of a typical portable power-operated reversible tool with which the teachings of the present invention may find particular utility, parts of the operating handle and trigger member being broken away and sectioned to show the preferred embodiment of the present invention;

FIGURE 1a is a section view, taken along the lines 1a—1a of FIGURE 1, and showing a means for pivotably mounting the trigger member on the handle;

FIGURE 2 is a perspective showing a typical application of the tool of FIGURE 1;

FIGURE 3 shows, somewhat schematically, the manner in which the handle would be grasped and the trigger depressed for "forward" operation of the tool;

FIGURE 4 corresponds substantially to that of FIGURE 3, but shows the manner in which the handle would be grasped and the trigger depressed for "reverse" operation of the tool;

FIGURE 5 is another embodiment, showing the manner in which the teachings of the present invention may be applied to a "compact" impact wrench, one having its operating handle secured rearwardly of the motor housing and forming an obtuse angle therewith; and FIGURE 6 is yet another embodiment, showing the manner in which the teachings of the present invention may be applied to an electrically-operated reversible tool, such as a portable electric impact wrench.

With reference to FIGURE 1, there is illustrated a typical pneumatic impact wrench 10 with which the teachings of the present invention may find particular utility. It will be appreciated by those skilled in the art, however, that the invention is equally applicable to other types of portable power-operated reversible tools, such as drills and tappers, and that the particular showing of the impact wrench 10 is intended to be illustrative of the invention. With this in mind, the impact wrench 10 generally comprises a motor housing 11, a reversible pneumatic motor in the motor housing, the motor being denoted as at 12, an impact clutch housing 13 secured forwardly of the motor housing, an impact clutch mechanism in the impact clutch housing, the mechanism being denoted generally as at 14 and being operatively connected to the motor, a bumper 14a of resilient material mounted on the forward portion of the impact clutch housing, a spindle 15 journaled in the impact clutch housing, the spindle being operatively connected to the impact clutch mechanism and being adapted to receive a socket or other tool element, an end cap 16 secured rearwardly of the motor housing, a handle 17, the handle preferably being a pendant handle formed integrally with the motor housing and providing a pistol-grip for the tool, a conduit 18 formed in the handle and adapted to be connected to a source of compressed air, a reversible valvular means 19 between the conduit and the pneumatic motor, and the trigger means of the present invention, the trigger means being denoted generally as at 20 and being adapted to control the energization of the tool, and simultaneously, to establish its direction of rotation.

The trigger means 20 of the present invention includes a single operating member formed as a trigger 21. The trigger 21 has a central or intermediate portion 22 and respective leg portions 23 and 24 emanating therefrom. Preferably, but not necessarily, the trigger is an aluminum die-casting and has a generally U-shaped cross section. With this construction, the intermediate portion of the trigger straddles a forwardly-extending boss 25 formed integrally with the handle, see FIGURE 1a, and the trigger is mounted on the boss by means of a pivot pin 26 passing transversely through the trigger and the boss. The trigger is thus pivotably mounted on the handle and extends substantially the entire length of the front face 27 formed on the handle, the face 27 preferably being recessed as shown in FIGURE 1 to accommodate the trigger and assure its convenient manipulation. The leg portion 23 of the trigger extends within the upper portion of the handle, while the leg portion 24 of the trigger extends within the lower portion of the handle. The leg portions of the trigger are formed (at their front surfaces) with concave recesses 28 and 29, respectively, which are adapted to receive the operator's fingers in his normal grasp of the tool handle. The upper leg portion of the trigger carries a pin 30 which is received within a slot 30a formed in a valve operating stem 31. The stem 31 is part of the reversible valvular means 19, and in this manner, the trigger is connected to the valvular means. Means are then provided within the valvular means for biasing the valve stem, and thus the trigger, to a "neutral" or "off" position intermediate its "forward" and "reverse" positions as shown in FIGURE 1.

When it is desired to energize the tool for operation in its "forward" rotative position, the handle is grasped as shown in FIGURE 3. In this position, the upper portion of the handle is grasped by the operator's hand, and the fingers of the operator's hand (usually the forefinger and middle finger) engage the upper leg portion 23 of the trigger 21 and retract or depress the same within the handle to pivot the trigger about the pin 26. The pivotal movement of the trigger causes the valve operating stem 31 to be depressed, and through the valvular means 19, causes the tool to be energized in its forward direction in a manner understood by one skilled in the art. On the other hand, when it is desired to operate the tool in its reverse position, the operator may shift the emphasis or pressure exerted by his fingers along the tool handle, such that his third finger and index finger now engage and depress the lower leg portion 24 of the trigger as shown in FIGURE 4. The trigger now pivots in the reverse direction, and thus the valve operating stem is advanced forwardly of the handle, causing the reversible valvular means to now operate the tool in its reverse position in a manner understood by those skilled in the art.

In FIGURE 1, the "neutral" or normal position of the trigger, in which the tool is deenergized, is shown in sectioned lines, while the alternate "forward" and "reverse" positions, respectively, are shown in broken lines. It will be appreciated, moreover, that if desired, the upper leg portion 23 of the trigger could be associated with the reverse operation of the tool, while the lower leg portion 24 could be associated with the forward operation of the tool; in other words, a reversal of the operation herein disclosed would be equally feasible. Also, it is not altogether necessary for the operator's hand to completely grasp the tool handle. For example, to operate the tool in its reverse position, the operator may, if desired, merely grasp the lower portion of the tool handle, completely supporting the tool thereby, with his forefinger and third finger now directly engaging the lower leg portion 24 of the trigger and depressing the same.

A typical application of the pneumatic impact wrench is shown in FIGURE 2. Here, the operator is removing the bolts or lugs from a rim for subsequent removal of the tire. Upon occasion, the lugs become rusted or "frozen" and hence somewhat difficult to remove. In this instance, it is often helpful to apply additional torque in the forward direction and then to quickly reverse the tool, thus "rocking" the lug and dislodging its threaded engagement. This "rocking" action may be achieved quickly and conveniently by use of the trigger means of the present invention, which facilitates a rapid reversal from "forward" to "reverse" in a truly "one-hand" operation. No longer is it necessary for the operator to bring his other hand across his body so as to manipulate the separately-mounted reversing element.

Moreover, the structure of the present invention allows for the operator's finger pressure on the trigger to be closely controlled, that is, balanced in a sense between the upper and lower leg portions of the trigger; and in such a manner, the structure facilitates a "feathering" of the trigger (and hence the valvular means) in both the forward and reverse positions, resulting in close, effective operator control over the output of the tool.

The details of the valvular means form no part of the present invention, but are described more particularly in the co-pending Wickham application Ser. No. 499,733, filed Oct. 21, 1965, entitled "Valve for Reversible Pneumatic Tool," and assigned to the assignee of the present invention. It will be appreciated by those skilled in the art, however, that any other type of reversible valvular means may be used, consonant with the teachings of the present invention.

With reference to FIGURE 5, another embodiment of the invention is illustrated. Here, a compact pneumatic wrench 32 has its operating handle 33 secured rearwardly of the motor housing and forming an obtuse angle therewith. Preferably, the handle 33 has a concave recess 34 running substantially around the handle for receiving the web portion of the operator's hand, between the thumb and forefinger, in his normal grasp of the tool handle. The trigger 35 is pivotably secured on the underside of the handle and functions in precisely the same manner as the pivoted trigger 21 of the embodiment of FIGURE 1.

With reference to FIGURE 6, yet another embodiment of the invention is illustrated. Here, the trigger means is used in connection with a portable electric tool having a reversible electric switch 36. The switch 36 performs both the control and reversing functions in a single component, and the switch has a pivoted toggle 37 connected to an intermediate portion 38 of a molded plastic trigger 39. When either the upper or lower portion of the trigger 39 is depressed within the handle, the toggle 37 of the reversible electric switch 36 shifts in one direction or another to energize the tool and determine its direction of rotation. The operation of this embodiment of the invention is thus identical with that of the previous embodiments concerning pneumatically-operated tools.

Obviously, many modifications may be made without departing from the basic spirit of the present invention; and accordingly, within the scope of the appended claims, the invention may be practiced other than has been specifically described herein.

I claim:
1. In a portable power-operated reversible tool, the combination of:
   (a) a housing including a portion providing a handle for the tool;
   (b) said handle having respective ends and a boss means intermediate said ends, and said handle further having a recessed front face running substantially the full length of said handle between said respective ends; and
   (c) a single elongated manually-manipulatable trigger member having an intermediate portion pivotably mounted on said boss means within said recessed front face of said handle, said trigger member further having respective leg portions emanating from its pivotably-mounted intermediate portion and terminating adjacent to said respective ends of said handle;
   (d) reversible control means within the housing, connected to said trigger member for energizing the tool for "forward" and "reverse" operation, respectively;
   (e) said respective leg portions of said trigger member being selectively retractable within said handle for actuating said reversible control means, with one of said respective portions, when retracted, facilitating "forward" operation of the tool, and with the other of said respective portions, when retracted, facilitating "reverse" operation of the tool; and
   (f) means normally biasing said trigger member to a "neutral" position intermediate its "forward" and "reverse" positions.

2. A portable power-operated reversible tool, comprising:
   (a) a housing including a reversible motor;
   (b) a handle secured rearwardly of said housing and forming an obtuse angle therewith;
   (c) reversible control means in said handle for energizing said motor and simultaneously establishing "forward" or "reverse" operation of the tool; and
   (d) a trigger having an intermediate portion pivotably mounted on the underside of said handle, said trigger being operatively connected with said reversible control means, and said trigger having respective leg portions on opposite sides of its pivotably-mounted intermediate portion, said respective leg portions being alternately engageable by the fingers of the operator for selectively energizing the tool in its forward or reverse direction.

3. The tool of claim 2, wherein:
   (a) said handle has a concave recess running substantially around said handle for receiving the web portion of the operator's hand, between the thumb and forefinger, in the operator's normal grasp of said handle.

4. A pivoted trigger means for a power-operated reversible tool, comprising:
   (a) a housing having a pendant pistol-grip handle adapted to be grasped by the operator's hand, thereby supporting the weight of the tool;

(b) a single, elongated trigger whose length is a substantial portion of the length of the handle;

(c) said trigger having an intermediate portion supported on said handle for pivotal movement about an axis transverse to the length of said handle;

(d) said trigger further having respective leg portions comprising an upper leg portion and a lower leg portion on opposite sides of its pivotably-supported intermediate portion;

(e) said handle having a front face, and said respective leg portions of said trigger both being disposed forwardly of said front face;

(f) reversible control means within the housing, connected to said trigger, for energizing the tool for "forward" and "reverse" operation, respectively; and (g) said respective leg portions of said trigger being selectively movable rearwardly relative to said handle to actuate said reversible control means, one of said leg portions accommodating "forward" operation of the tool, and the other "reverse";

(h) whereby, in grasping the handle, the operator's thumb may be wrapped around said pistol-grip handle, his forefinger and middle finger may be poised to actuate said upper leg portion of said trigger, and his remaining two fingers may be poised to actuate said lower leg portion of said trigger; whereby the operator has a convenient "one hand" control over the tool, and whereby the operator may maintain his normal gripping position while changing from "forward" to "reverse," and vice-versa.

5. A pivoted trigger means for a power-operated reversible tool as defined in claim 4, wherein:

(a) said front face of said handle has a recess, and said trigger is disposed partially within said recess.

6. A pivoted trigger means for a power-operated reversible tool as defined in claim 4, wherein:

(a) said handle has a boss means formed thereon intermediate the length of said handle; and wherein:

(b) said intermediate portion of said trigger is pivotably supported on said boss means.

7. A pivoted trigger means for a power-operated reversible tool as defined in claim 4, wherein:

(a) said leg portions of said trigger have respective ends; and wherein (b) said reversible control means includes a movable operating member connected to a respective end of one of said leg portions of said trigger.

8. A pivoted trigger means for a power-operated reversible tool, comprising:

(a) a handle having respective ends and further having a recessed face continuing for a substantial portion of the length of the handle;

(b) a single, elongated trigger having an intermediate portion supported within said recessed face;

(c) means pivotally connecting said intermediate portion and said handle for pivotal movement of said trigger about an axis transverse to the length at the handle;

(d) reversible control means within the tool, including a movable operating member for energizing the tool for "forward" and "reverse" operation, respectively;

(e) said trigger having respective leg portions on opposite sides of its pivotably-supported intermediate portion, and said respective leg portions being manually retractable within said recessed face of said handle to actuate said reversible control means;

(f) one of said leg portions of said trigger accommodating "forward" operation of the tool, and the other accommodating "reverse";

(g) each of said leg portions of said trigger having a respective end confronting a respective end of said handle; and (h) means connecting said movable operating member to a respective end only of one of said leg portions of said trigger.

References Cited

UNITED STATES PATENTS

| | | | |
|---|---|---|---|
| 2,493,957 | 1/1950 | Fitch | 173—169 X |
| 2,632,424 | 3/1953 | Slomer | 173—169 X |
| 2,672,129 | 3/1954 | Fischer | 173—169 X |
| 2,690,321 | 9/1954 | Luna et al. | 74—104 X |
| 2,744,176 | 5/1956 | Kaman | 310—50 X |
| 3,019,673 | 2/1962 | Sjostrand et al. | 77—7 |
| 3,102,621 | 9/1963 | Van Sittert | 173—169 X |

FRED C. MATTERN, Jr., *Primary Examiner.*

L. P. KESSLER, *Assistant Examiner.*